United States Patent
Li

(10) Patent No.: US 10,602,055 B2
(45) Date of Patent: Mar. 24, 2020

(54) METHOD OF FOCUSING, TERMINAL, AND COMPUTER-READABLE STORAGE MEDIUM

(71) Applicant: GUANGDONG OPPO MOBILE TELECOMMUNICATIONS CORP., LTD., Dongguan, Guangdong (CN)

(72) Inventor: Xiaopeng Li, Guangdong (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 33 days.

(21) Appl. No.: 16/008,322

(22) Filed: Jun. 14, 2018

(65) Prior Publication Data

US 2018/0367725 A1 Dec. 20, 2018

(30) Foreign Application Priority Data

Jun. 16, 2017 (CN) .......................... 2017 1 0459606

(51) Int. Cl.
H04N 5/232 (2006.01)
(52) U.S. Cl.
CPC ..... *H04N 5/23219* (2013.01); *H04N 5/23245* (2013.01); *H04N 5/23254* (2013.01); *H04N 5/232122* (2018.08); *H04N 5/232123* (2018.08); *H04N 5/232127* (2018.08); *H04N 5/232945* (2018.08)
(58) Field of Classification Search
CPC ......... H04N 5/23212; H04N 5/232122; H04N 5/232123; H04N 5/232127; H04N 5/23219; H04N 5/23245; H04N 5/23254
See application file for complete search history.

(56) References Cited

U.S. PATENT DOCUMENTS

| 7,747,158 | B2 | 6/2010 | Ueda |
| 8,760,564 | B2 | 6/2014 | Matsuda |
| 2008/0205870 | A1 | 8/2008 | Ueda |
| 2009/0284645 | A1 | 11/2009 | Nozaki |
| 2010/0097515 | A1 | 4/2010 | Ishii |

(Continued)

FOREIGN PATENT DOCUMENTS

| CN | 104159037 A | 11/2014 |
| CN | 106060407 A | 10/2016 |

(Continued)

OTHER PUBLICATIONS

International Search Report in international application No. PCT/CN2018/091352, dated Aug. 17, 2018.

(Continued)

*Primary Examiner* — Daniel M Pasiewicz
(74) *Attorney, Agent, or Firm* — Ladas & Parry LLP

(57) ABSTRACT

A method of focusing, a terminal, and computer-readable storage medium are disclosed. The method includes obtaining a facial region of interest in an image in a photographing preview mode, focusing on the facial region of interest in a first focusing mode, determining whether the facial region of interest in the first focusing mode is stable, and triggering a second focusing mode to refocus on the facial region of interest in response to the determination that the facial region of interest in the first focusing mode is stable, the first focusing mode being different from the second focusing mode.

14 Claims, 7 Drawing Sheets

(56) References Cited

U.S. PATENT DOCUMENTS

| | | |
|---|---|---|
| 2011/0261220 A1 | 10/2011 | Matsuda |
| 2013/0038780 A1 | 2/2013 | Ishii |
| 2013/0300908 A1 | 11/2013 | Ishii |
| 2016/0227101 A1* | 8/2016 | Iwasaki .............. H04N 5/23212 |
| 2016/0295101 A1* | 10/2016 | Ogino ................ H04N 5/23212 |
| 2019/0273860 A1* | 9/2019 | Miyazawa ......... H04N 5/23212 |

FOREIGN PATENT DOCUMENTS

| | | |
|---|---|---|
| CN | 106385542 A | 2/2017 |
| CN | 106713750 A | 5/2017 |
| CN | 106791427 A | 5/2017 |
| CN | 107257433 A | 10/2017 |
| JP | 2008180906 A | 8/2008 |
| JP | 2013140256 A | 7/2013 |

OTHER PUBLICATIONS

English Translation of the Written Opinion of the International Search Authority in international application No. PCT/CN2018/091352, dated Aug. 17, 2018.

European Search Report in European application No. 18178015.6, dated Sep. 4, 2018.

\* cited by examiner

METHOD OF FOCUSING, TERMINAL, AND COMPUTER-READABLE STORAGE MEDIUM

CROSS REFERENCE TO RELATED APPLICATIONS

This application claims the priority benefit of Chinese Patent Application No. 201710459606.5, titled "METHOD OF FOCUSING, DEVICE, TERMINAL, AND COMPUTER-READABLE STORAGE" and filed on Jun. 16, 2017, the contents of which are incorporated by reference herein in their entirety for all purposes.

TECHNICAL FIELD

The present disclosure relates to the field of focusing technologies, and in particular to a method of focusing, terminal, and computer-readable storage medium.

BACKGROUND TECHNOLOGY

With the rapid development of smart terminals, the photographing function of the smart terminals becomes more and more frequently used, especially for photographing people. Shopping malls, attractions, and places of interest can be commonly seen with people taking group photos or selfies. In the industry currently, cameras in the terminals usually support face focus function, a technology in which focusing is triggered based on detection of the facial region. That is, focusing and photographing are realized with the face as the best clear point of focus.

When photographing the face, an automatic focus (AF) mode is usually triggered to complete the photographing after a facial region of interest (ROI) obtained is stable. However, movements of the object during the photographing may blur the photograph obtained.

SUMMARY

Embodiments of the present disclosure provide a method of focusing, terminal, and computer-readable storage medium, which are capable of ensuring that a moving face can be photographed clearly with fast and accurate focusing.

According to an aspect, a method of focusing is provided. The method includes obtaining a facial region of interest in an image in a photographing preview mode, focusing on the facial region of interest in a first focusing mode, determining whether the facial region of interest in the first focusing mode is stable, and triggering a second focusing mode to refocus on the facial region of interest in response to the determination that the facial region of interest in the first focusing mode is stable, the first focusing mode being different from the second focusing mode.

According to another aspect, a terminal is provided. The terminal includes an imaging device, a display device, a memory, a processor and a computer program. The computer program is stored on the memory and configured to be executed by the processor to implement one or more actions. The one or more actions include obtaining a facial region of interest in an image in a photographing preview mode, focusing on the facial region of interest in a first focusing mode, determining whether the facial region of interest in the first focusing mode is stable, and triggering a second focusing mode to refocus on the facial region of interest in response to the determination that the facial region of interest in the first focusing mode is stable, the first focusing mode being different from the second focusing mode.

Further, a computer readable storage medium having stored thereon a computer program is provided. The computer program is configured to be executed by a processor to implement a one or more actions. The one or more actions include obtaining a facial region of interest in an image in a photographing preview mode, focusing on the facial region of interest in a first focusing mode, determining whether the facial region of interest in the first focusing mode is stable, and triggering a second focusing mode to refocus on the facial region of interest in response to the determination that the facial region of interest in the first focusing mode is stable, the first focusing mode being different from the second focusing mode.

Other features of the technology will be apparent from consideration of the information contained in the following detailed description.

DESCRIPTION OF THE DRAWINGS

In order to better illustrate the technical schemes of the present disclosure, a brief description of the accompanying drawings used herein is given below. Obviously, the drawings listed below are only embodiments and a person skilled in the art should be noted that, other drawings can also be obtained on the basis of these exemplary drawings without creative activity.

DETAILED DESCRIPTION

To make the objectives, technical solutions, and advantages of the present disclosure clearer, the present disclosure are described in further detail with reference to the accompanying drawings and embodiments. It should be understood that the specific embodiments described herein are only used to explain the present disclosure and are not intended to limit the same.

Terminals in various embodiments of the disclosure will now be described with reference to the accompanying drawings. In the following description, words such as "module" or "unit" for representing elements are used merely for facilitating the description and do not have a specific meaning. Therefore, "module" and "unit" can be mixedly used.

It should be noted that a focusing device provided in an embodiment may be applied to a terminal, such as a terminal capable of photographing, including a computer or a mobile terminal, etc.

Figure 1:
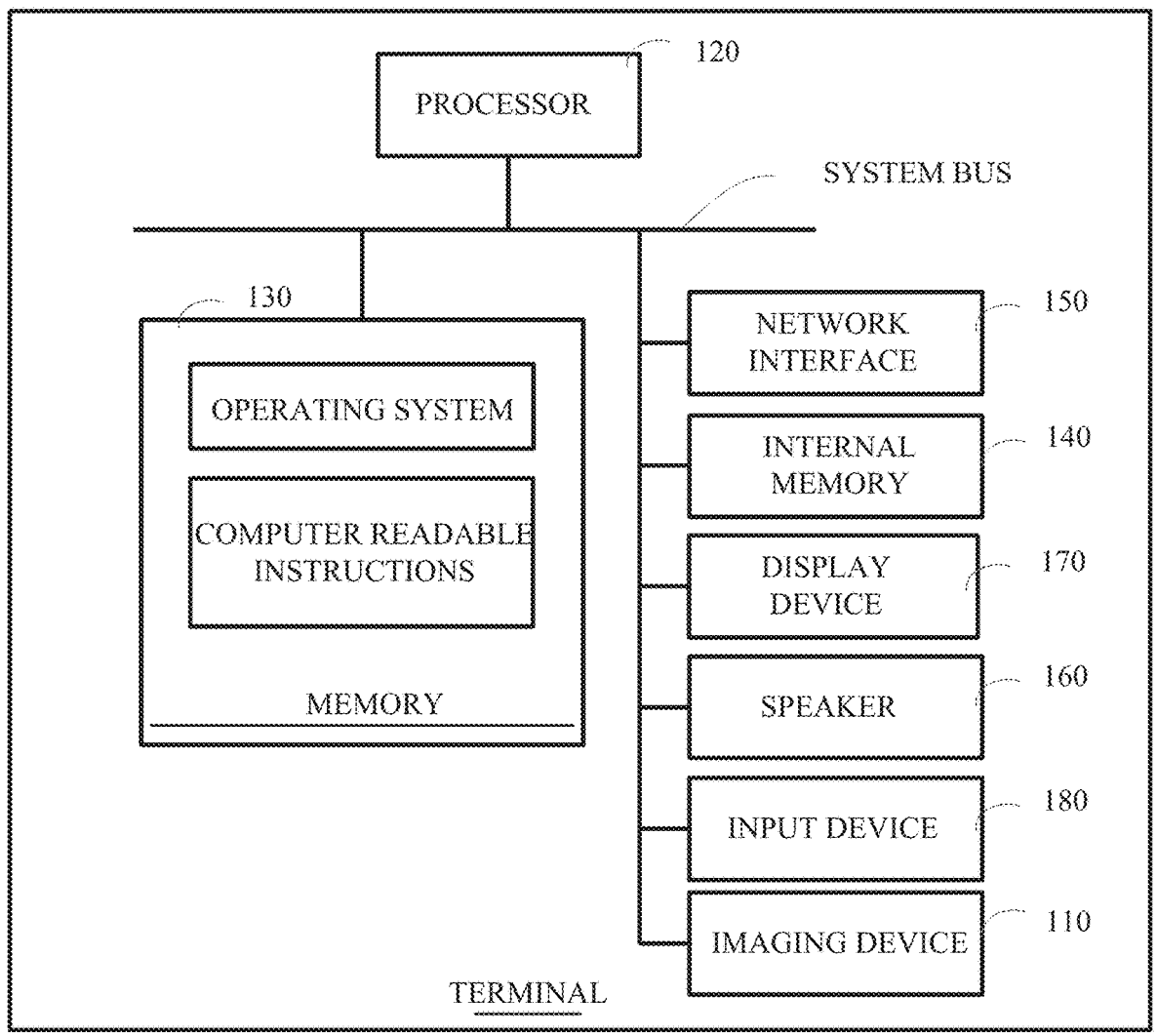
FIG. 1 is a schematic diagram of an internal structure of a terminal in an embodiment.

The terminal can be implemented in various forms. For example, the terminals described in the present disclosure may include a mobile terminal, such as a mobile phone, a smart phone, a notebook computer, a personal digital assistant (PDA), a tablet (PAD), a portable multimedia player (PMP), a navigation device, and the like, and a fixed device such as digital TVs, desktop computers, and the like. In the following, it is assumed that the terminal is a mobile terminal. However, it will be understood by those skilled in the art that, except for the elements that are particularly used for the purpose of movement, the configuration according to the embodiment can also be applied to a terminal of fixed type. FIG. 1 is a schematic diagram of an internal structure of a terminal in an embodiment. As shown in FIG. 1, the terminal includes an imaging device 110, a processor 120, a memory 130, an internal memory 140, a network interface 150, a speaker 160, a display device 170, and an input device 180 that are connected through a system bus. The memory 130 of the terminal stores an operating system and computer readable instructions. The computer readable instructions are executed by the processor 120 to implement a method of focusing. The processor 120 is used to provide computing and control capabilities to support the operation of the entire terminal. The internal memory 140 in the terminal provides an environment for the execution of computer-readable instructions in the memory 130. The network interface 150 is used for network communication with the server. The display screen 170 of the terminal may be a liquid crystal display or an electronic ink display, and the input device 180 may be a touch layer covering the display screen, a button, a trackball or a touchpad provided on the terminal housing, or may be an external keyboard, a touchpad, or a mouse. A person skilled in the art can understand that the structure shown in FIG. 1 is merely a block diagram of a partial structure related to the solution of the present disclosure, and does not constitute a limitation on the terminal to which the solution of the present application is applied. The specific terminal may include more or fewer components than shown in the figure, or combination of some components, or different component arrangements.

Figure 2:
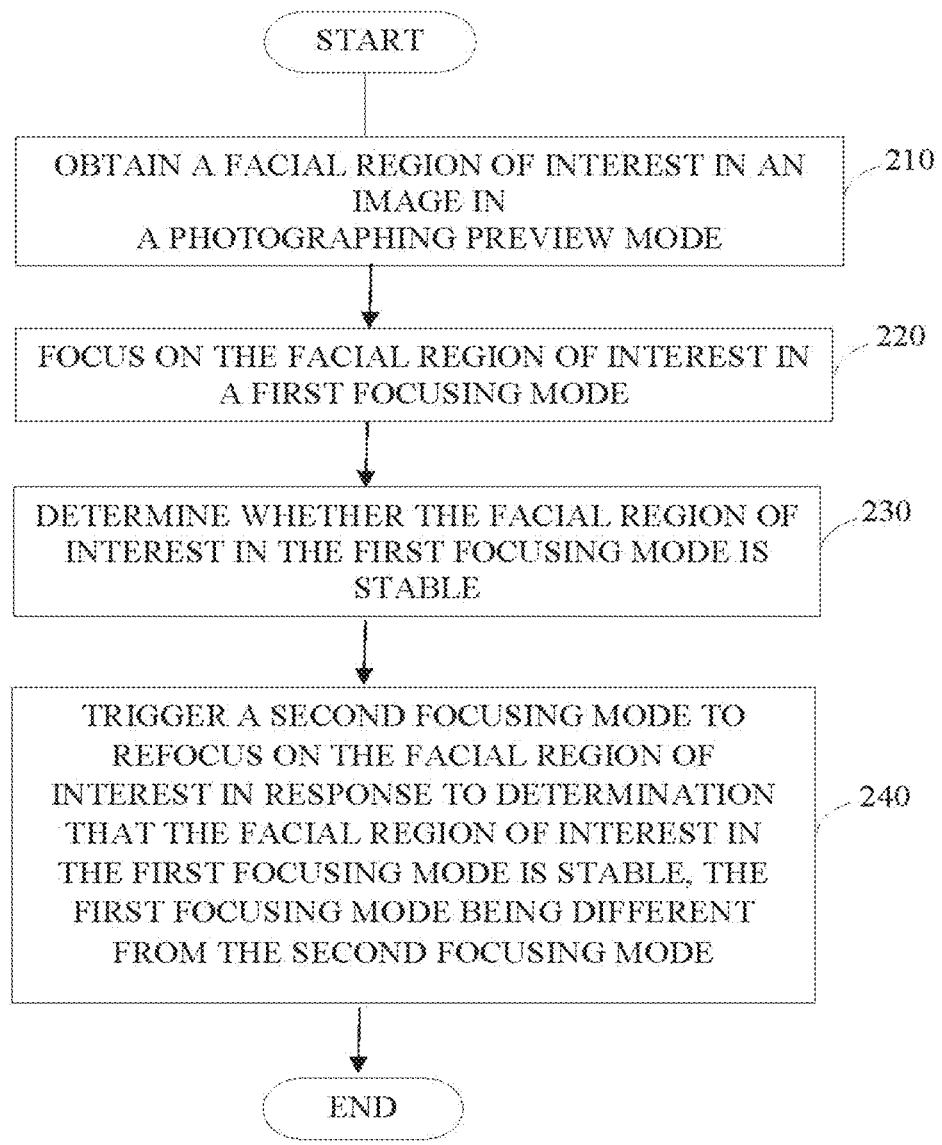
FIG. 2 is a flow diagram of a method of focusing in an embodiment.

FIG. 2 is a flowchart of a method of focusing in an embodiment. In the embodiment, a method of focusing is provided. At 210, a facial region of interest in an image is obtained in a photographing preview mode.

It should be noted that a method of focusing provided in this embodiment of the present disclosure is implemented in a scene where photographing is performed on a terminal. When a user wants to take a picture, an imaging device 110 of the terminal can be activated. The imaging device 110 may be a front camera, a rear camera, a dual camera, or the like. The imaging device 110 of the terminal is activated to enter a photographing preview mode. The face in the image is detected by a preset face recognition algorithm, and the position information of the face in the image is obtained. Usually, the face in the image can be surrounded by a face frame, and the boundary parameter information of the face frame is regarded as the face position information. Face frames can be boxes, rounded boxes, or other geometric closed boxes.

Specifically, when the face frame is a box, the face position information includes the horizontal and vertical coordinate information of the starting point of the face frame, the length information of the face frame, and the width information of the face frame.

According to the detected position information of the face, the face position information obtained may be converted by the preset autofocus algorithm (AF) into information of facial region of interest (ROI) required in the focusing process. A facial region of interest, in the fields of machine vision and image processing, is a region to be processed outlined in various shapes including a box, a circle, an ellipse, an irregular polygon, etc. from the processed image. In machine vision software such as Halcon, OpenCV, Matlab and the like, various operators and functions are commonly used to obtain the facial region of interest, and perform the next step of the image processing. In general, the above conversion process is to enlarge and/or stretch the face frame so as to form a facial region of interest.

Figure 3:
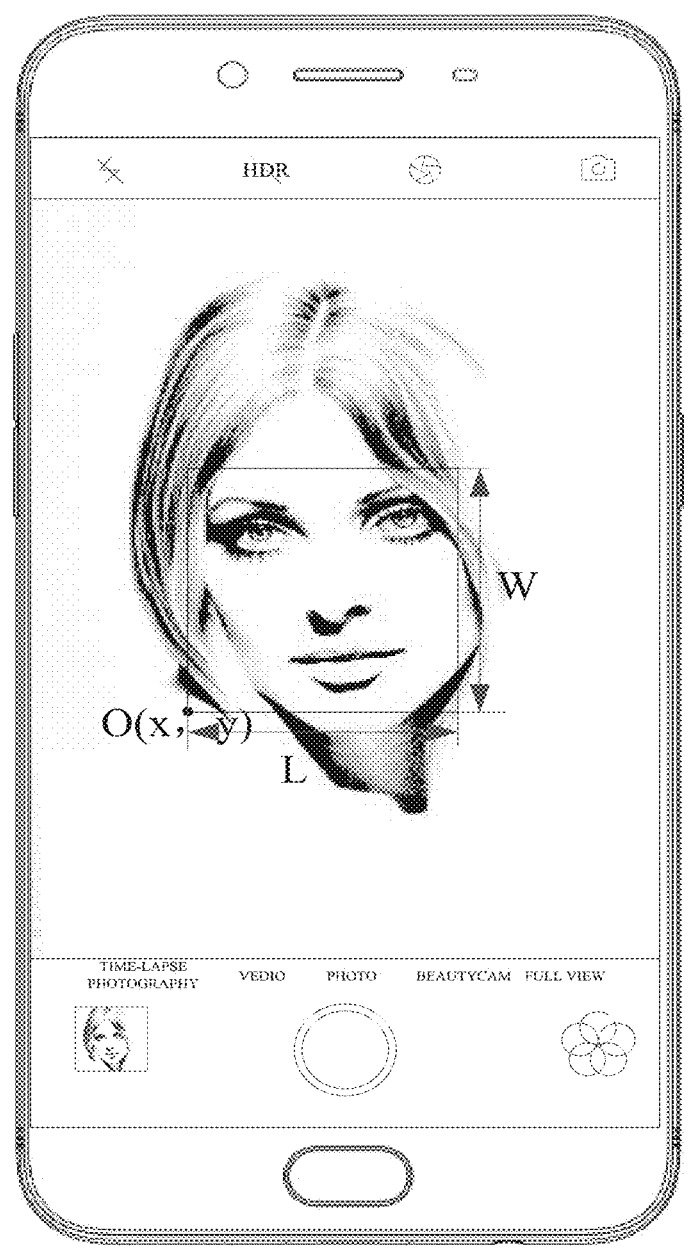
FIG. 3 is a diagram showing a region of interest of a human face in an embodiment.

Specifically, in the embodiment of the present disclosure, the facial region of interest is a region to be processed in a box outlined from the processed image. The position information of the facial region of interest is the border coordinate parameter information of the box. Referring to FIG. 3, the border coordinate parameter information includes the horizontal and vertical coordinate information O(x,y) of a certain vertex of the box, the length information L and the width information W of the box.

At 220, the method proceeds to focusing on the facial region of interest in a first focusing mode.

For example, the first focusing mode can be a Phase Detection Auto Focus mode, which is abbreviated as PDAF mode. The facial region of interest in each frame can be focused on in a PDAF mode. The principle of PDAF mode is to reserve some shielded pixels specialized for phase detection on the photosensitive element, and determine the offset value of focusing according to the distance between the pixels and its changes, thereby realizing accurate focusing. In the PDAF mode, only the offset value is detected, and only the signal of "accurate focus" or "inaccurate focus" is provided. The focusing system can thereby know the direction of the offset according to the peak position of the signal.

Specifically, in the embodiment, the PDAF mode relates to directly integrating the autofocus sensor and the pixel sensor; that is, taking out pairs of left and right pixel points from the pixel sensor to respectively detect information such the light amount of the object in the scene. By comparing the relevant values of the left and right sides, it is possible to find the accurate focus point quickly, prior to that the lens motor pushes in one effort the lens to the corresponding position to complete the focusing.

PDAF does not require the repeated movements of the lens, thus the focusing stroke can be much shorter, and the focusing process is neat and quick. By means of these characteristics of PDAF, there is no need to wait for the face to be stable; thereby the real-time tracking of the face can be achieved.

At 230, the method goes to determining whether the facial region of interest in the first focusing mode is stable.

At 240, a second focusing mode is triggered to refocus on the facial region of interest in response to the determination that the facial region of interest in the first focusing mode is stable. The first focusing mode is different from the second focusing mode.

By determining whether the facial region of interest in the first focusing mode is stable, the second focusing mode, which can be an auxiliary focusing mode, is triggered to refocus on the facial region of interest in response to the determination that the facial region of interest in the first focusing mode is stable. In this way, it is possible to quickly determine a substantial focus region by PDAF which is a coarse focusing mode; after the facial region of interest is stable, a fine focus is performed in the auxiliary focusing mode so as to determine the most accurate focus position. That is, by the combined focusing of the PDAF mode and the auxiliary focusing mode, the focus time can be greatly reduced and the automatic focusing on the facial region of interest can be achieved quickly and accurately.

In the above method of focusing, a facial region of interest in the focusing process is determined according to the position information detected in the image, and focusing is performed in the PDAF mode once the facial region of interest is determined. That is, as long as a face appears in the photographing preview mode, the face will always be clear no matter how it moves. At the same time, when the facial region of interest in the PDAF mode is stable, the auxiliary focusing mode will be triggered to refocus on the facial region of interest. By the combined focusing of the PDAF mode and the auxiliary focusing mode, the focus time can be greatly reduced and the automatic focusing of the facial region of interest can be achieved quickly and accurately.

In an embodiment, the criterion for determining the stability of the facial region of interest includes obtaining position information of the facial region of interest in the first focusing mode in consecutive N frames, and determining whether the position information of the facial region of interest changes.

Specifically, N is in the range of 3 to 5, that is, $3 \leq N \leq 5$.

When N=3, firstly, the position information of facial region of interest in the first frame is detected and stored. Then, the position information of the facial region of interest in the second frame is obtained, and it is determined whether the position information of the facial region of interest in the second frame changes relative to the position information of the facial region of interest in the first frame. If the position information of the facial region of interest in the second frame changes, it indicates that the facial region of interest is not stable. If no change occurs, the position information of the facial region of interest in the third frame will be obtained, and it is determined whether the position information of the facial region of interest in the third frame changes relative to the position information of the facial region of interest in the first frame. If the position information of the facial region of interest in the third frame changes, it indicates that the facial region of interest is not stable. If no change occurs, it indicates that the facial region of interest is stable.

Optionally, when N=4 or N=5, the above method can also be used to determine the stability of the facial region of interest in the continuous N frames.

In an embodiment, determining whether the position information of the facial area of interest in consecutive N frames changes includes obtaining and determining whether the border coordinate parameter information of the facial area of interest of the continuous N frames changes. Specifically, the facial region of interest is a closed box, and the border coordinate parameter information is the horizontal and vertical coordinate information of a certain vertex (O) of the box, the length information and the width information of the box. If any one of the parameters in the border coordinate parameter information of the facial region of interest in the consecutive N frames changes, it is considered that the facial region of interest is not stable. If all the parameters in the border coordinate parameter information have not changed, it is considered that the facial region of interest is stable.

Figure 4:
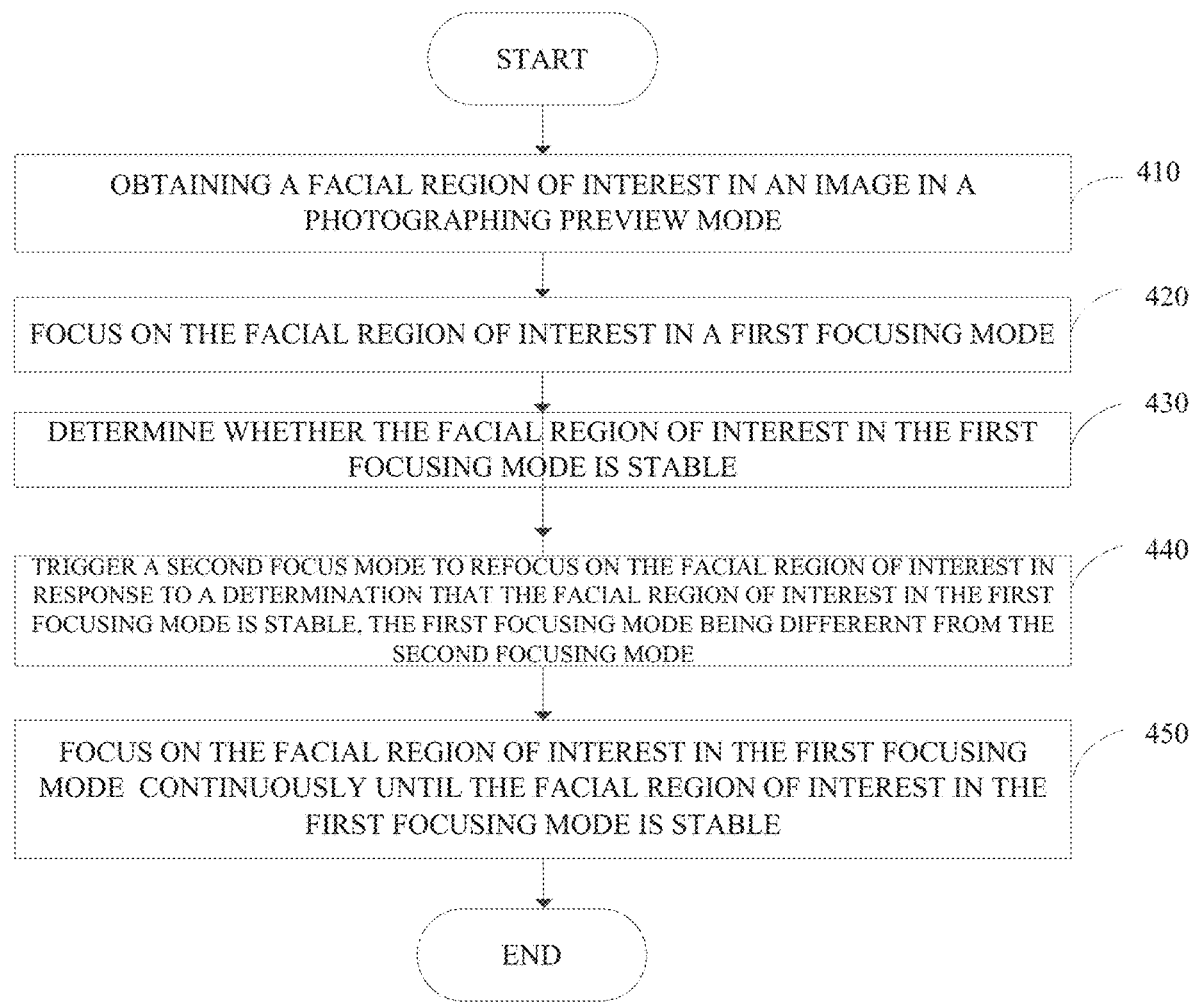
FIG. 4 is a flow diagram of a method of focusing in another embodiment.

In an embodiment, referring to FIG. 4, method of focusing is illustrated in detail. At 440, when it is detected that the facial region of interest is not stable, the facial region of interest in the first focusing mode is focused on in the PDAF mode continuously until the facial region of interest in the first focusing mode is stable.

The blocks 410, 420, 430 and 440 are in one-to-one correspondence to 210, 220, 230 and 240 in FIG. 2, and details are not described herein again.

The method at 450 may be understood as: when the position information of the facial region of interest in the second frame is not consistent with the position information of the facial region of interest in the first frame, the facial region of interest in the second frame is focused on in the PDAF mode. If the position information of the facial region of interest in the third frame is not consistent with the position information of the facial region of interest in the second frame, the facial region of interest in the third frame mode is focused on in the PDAF mode until the position information of the facial regions of interest in the fourth to fifth frames is consistent with the position information of the facial region of interest in the third frame.

In an embodiment, the auxiliary focusing mode is a contrast focusing mode.

In the contrast focus technology, when the imaging device 110 starts focusing, the driven lens gradually moves. The focus value (FV) of the focus region is calculated in real time during the lens movement process according to a preset algorithm. It is found that the focus value is gradually increased, reaching a maximum value (with a highest sharpness of the focus region) of the focus region of the frame at the focusing. The focus value represents the sharpness of the image, and is obtained by processing the image output by the imaging device 110. In general, the higher the contrast of the focus area, the larger the focus value of the image. Thus, the contrast focusing mode achieves focusing by finding the focus position corresponding to the largest focus value of the image.

Specifically, in the contrast focusing mode, the coarse scanning performs a larger range of searches at a first step length. Assuming that the total stroke of the motor is 1000, in the coarse scanning process, the motor starts the search at the first step length (80), and a focus value is calculated each time the motor moves by a distance of 80. During moving of the motor, the focus value is gradually increased, until the motor moves to a position (A) where the focus value is in a decreasing trend. At this time, the coarse scanning process is ended and the fine scanning is started. The fine scanning starts the search backwards at a second step length (30) from the point (A) where the coarse scanning is ended. In the process of the fine scanning, the focus value is calculated each time the motor moves by a distance of 30. During moving of the motor, the focus value is gradually increased until the motor moves to a certain position (B) where the focus value is in a decreasing trend. At this time the fine scanning process is ended. The driving distances of the motor and corresponding focus values at the position A, position B, and a position Q that does not coincide with A or B in the process of fine scanning are obtained respectively. A simple quadratic function is fitted according to the three positions. The vertex ordinate of the quadratic function is obtained, which is the maximum focus value of the focus region of a frame at the time of focusing. Accordingly, the driving motor moves to the vertex abscissa of the quadratic function, and the focusing can be achieved.

Optionally, the auxiliary focusing mode may also be a laser focusing mode.

By an infrared laser sensor installed adjacent to the rear camera, the terminal can emit a low-power laser beam to the object to be photographed. When the laser beam encounters an obstacle, i.e., focus target, it will return back and be received by the sensor. Then, the distance between the sensor and the object to be photographed can be calculated based on the movement time. The inter-lens motor can then directly push the lens to the corresponding position to complete the focusing.

Figure 5:
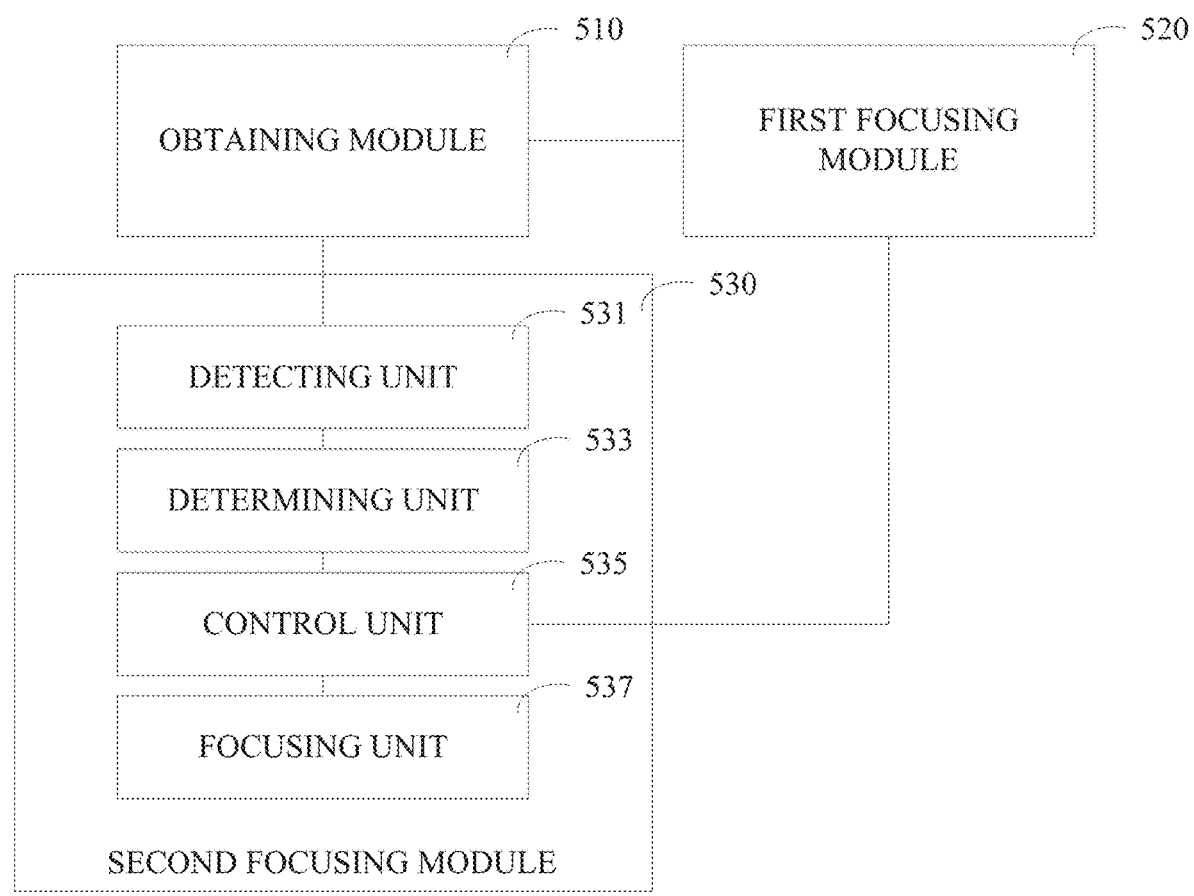
FIG. 5 is a structural block diagram of a focusing device in an embodiment.
Figure 6:
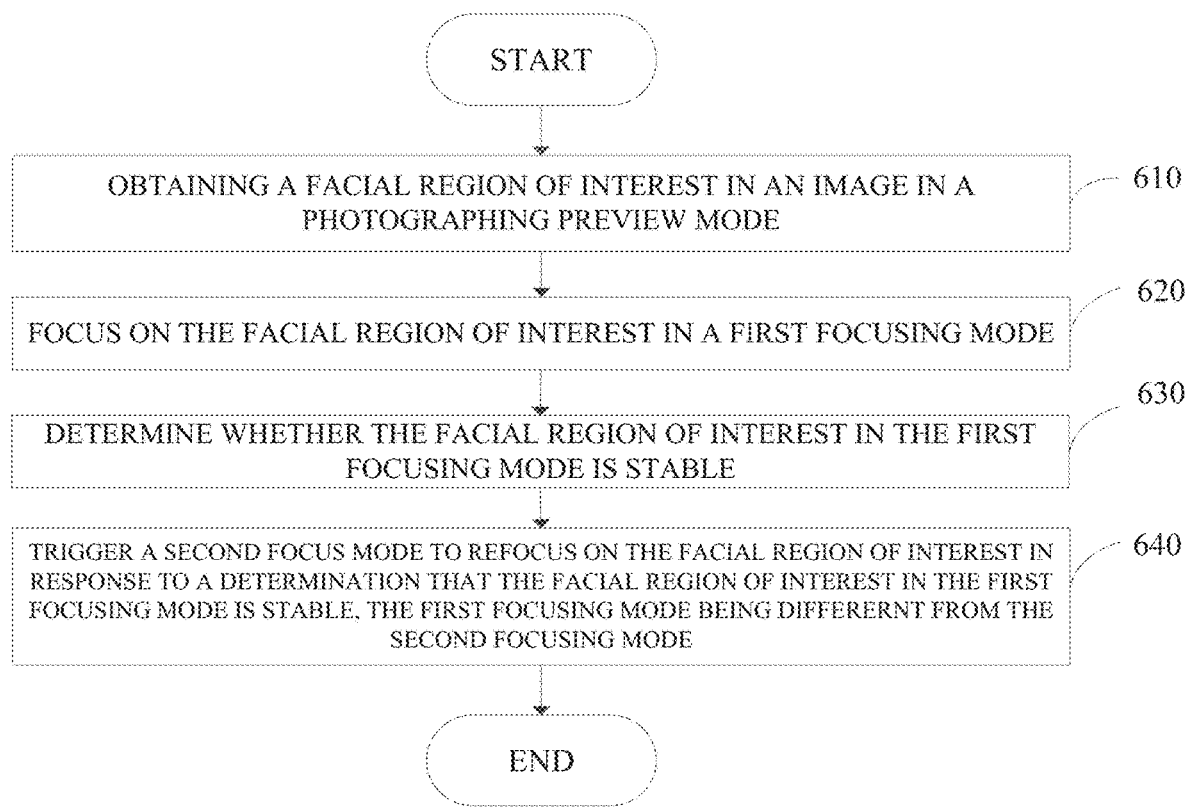
FIG. 6 is a flow diagram of the steps implemented by a terminal processor when executing a computer program in an embodiment.

In addition, an embodiment of the present disclosure further provides a focusing device. Referring to FIG. 5, the focusing device includes an obtaining module 510, a first focusing module 520 and a second focus module 530. The obtaining module 510 is configured to obtain a facial region of interest in an image in a photographing preview mode. The first focusing module 520 is configured to focus on the facial region of interest in a first focusing mode. The second focus module 530 is configured to determine whether the facial region of interest in the first focusing mode is stable, and trigger a second focusing mode to refocus on the facial region of interest in response to the determination that the facial region of interest is stable. The first focusing mode is different from the second focusing mode. In an embodiment, the first focusing mode can be a Phase Detection Auto Focus (PDAF) mode, and the second focusing mode is an auxiliary focusing mode.

In the focusing device, the obtaining module 510 can obtain a facial region of interest in the focusing process according to the position information detected in the image. Once the facial region of interest is determined, the first focusing module 520 can perform the focusing process in the PDAF mode. That is, as long as a face appears in the photographing preview mode, the face will always be clear no matter how it moves. Meanwhile, when the facial region of interest is stable, the second focus module 530 will trigger an auxiliary focusing mode to refocus on the facial region of interest. By the combined focusing of the PDAF mode and the auxiliary focusing mode, the focusing time can be greatly reduced, and the automatic focusing on the facial region of interest can be achieved quickly and accurately.

In an embodiment, the second focusing module 530 includes a detecting unit 531, a determining unit 533, a control unit 535 and a focusing unit 537. The detecting unit 531 is configured to detect position information of the facial region of interest in consecutive N frames. The determining unit 533 is configured to determine whether the position information of the facial region of interest in the consecutive N frames changes. The control unit 535 is configured to determine whether the facial region of interest is stable or not according to a determination result of the determining unit 533, and generate a first focus signal when the facial region of interest is stable, or a second focus signal when the facial region of interest is not stable. The focusing unit 537 is configured to receive the second focus signal, and trigger the auxiliary focusing mode to refocus on the facial region of interest.

Specifically, N is in the range of 3 to 5, that is, $3 \leq N \leq 5$.

When N=3, firstly, the position information of facial region of interest in the first frame is detected and stored. Then, the position information of the facial region of interest in the second frame is detected, and it is determined whether the position information of the facial region of interest in the second frame changes relative to the position information of the facial region of interest in the first frame. If the position information of the facial region of interest in the second frame changes, it indicates that the facial region of interest is not stable. If no change occurs, the position information of the facial region of interest in the third frame will be detected, and it is determined whether the position information of the facial region of interest in the third frame changes relative to the position information of the facial region of interest in the first frame. If the position information changes, it indicates that the facial region of interest is not stable. If no change occurs, it indicates that the facial region of interest is stable.

Optionally, when N=4 or N=5, the above device can also be used to determine the stability of the facial region of interest in the continuous N frames.

The control unit 535 can determine the stability of the facial region of interest according to a determination result of the determining unit 533, and generates a second focus signal when the facial region of interest is not stable. The focusing unit 537 receives the second focus signal and triggers the auxiliary focusing mode to refocus on the facial region of interest.

In an embodiment, the auxiliary focusing mode is a contrast focusing mode.

In the contrast focus technology, when the imaging device 110 starts focusing, the driven lens gradually moves. The focus value (FV) of the focus region is calculated in real time during the lens movement process according to a preset algorithm. It is found that the focus value is gradually increased, reaching a maximum value (with a highest sharpness of the focus region) of the focus region of the frame at the focusing. The focus value represents the sharpness of the image, and is obtained by processing the image output by the imaging device 110. In general, the higher the contrast of the focus area, the larger the focus value of the image. Thus, the contrast focusing mode achieves focusing by finding the focus position corresponding to the largest focus value of the image.

Optionally, the auxiliary focusing mode may also be a laser focusing mode.

By an infrared laser sensor installed adjacent to the rear camera, the terminal can emit a low-power laser beam to the object to be photographed. When the laser beam encounters an obstacle, i.e., focus target, it will return back and be received by the sensor. Then, the distance between the sensor and the object to be photographed can be calculated based on the movement time. The inter-lens motor can then directly push the lens to the corresponding position to complete the focusing.

In an embodiment, the first focus module 520 is further configured to receive the first focus signal and continually use the PDAF mode to focus on the facial region of interest until the facial region of interest is stable.

It may be understood that if the position information of the facial region of interest in the second frame is not consistent with the position information of the facial region of interest in the first frame, the first focus module 520 may continuously focus on the facial region of interest in the second frame in the PDAF mode. If the position information of the facial region of interest in the third frame is still not consistent with the position information of the facial region of interest in the second frame, the first focus module 520 may focus on the facial region of interest in the third frame in the PDAF mode continuously until the position information of the facial regions of interest in the fourth to fifth frames is consistent with the position information of the facial region of interest in the third frame.

The location information of the facial region of interest in the PDAF mode is the border coordinate parameter information of the facial region of interest.

Specifically, the facial region of interest is a closed box, and the border coordinate parameter information is the horizontal and vertical coordinate information of a certain vertex (O) of the box, the length information and the width information of the box. If any one of the parameters in the border coordinate parameter information of the facial region of interest in the consecutive N frames changes, it is considered that the facial region of interest is not stable. If all the parameters in the border coordinate parameter information have not changed, it is considered that the facial region of interest is stable.

The division of each module in the above-mentioned focusing device is only used for illustration. In other embodiments, the focusing device may be divided into different modules as required to complete all or part of the functions of the above-mentioned focusing device.

The embodiments of the disclosure also provide a terminal. As shown in FIG. 1, for ease of description, only the parts relevant to the embodiments of the present disclosure are shown. For the specific technical details that are not disclosed, please refer to the method parts of the embodiments of the present disclosure. A terminal includes an imaging device 110, a processor 120, a memory 130, a display device 170, and a computer program stored on the memory and operable on the processor 120.

In the embodiment of the present disclosure, the processor 120 included in the terminal can implement one or more actions when executing the computer programs stored in the memory. The one or more actions include, at 610, obtaining a facial region of interest in an image in a photographing preview mode. At 620, the facial region of interest is focused on in a first focusing mode. AT 630, it is determined whether the facial region of interest in the first focusing mode is stable. At 640, a second focusing mode is triggered to refocus on the facial region of interest in response to the determination that the facial region of interest in the first focusing mode is stable. The first focusing mode is different from the second focusing mode. In an embodiment, the first focusing mode is the Phase Detection Auto Focus (PDAF) mode, and the second can be a contrast focus mode or a laser focus mode.

When executing the computer program by the processor 120 of the terminal, a facial region of interest in the focusing process can be determined according to the position information detected in the image, and focusing is performed in the PDAF mode once the facial region of interest is determined. That is, as long as a face appears in the photographing preview mode, the face will always be clear no matter how the face moves. At the same time, when the facial region of interest in the PDAF mode is stable, the auxiliary focusing mode will be triggered to refocus on the facial region of interest. By the combined focusing of the PDAF mode and the auxiliary focusing mode, the focus time can be greatly reduced and the automatic focusing of the facial region of interest can be achieved quickly and accurately.

Figure 7:
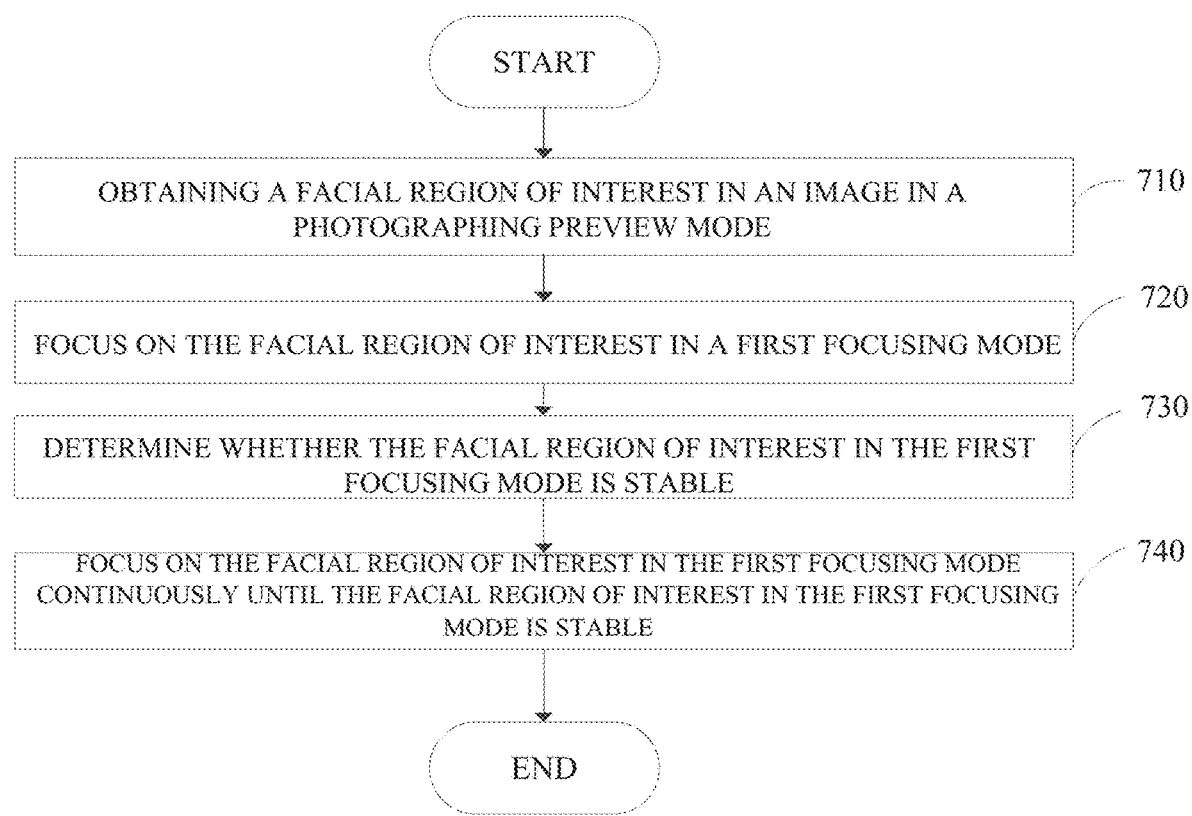
FIG. 7 is a flow diagram of the actions implemented when computer programs (instructions) stored on a computer-readable storage medium is executed by a processor in an embodiment.

FIG. 7 is a flow diagram of the actions implemented when the computer program (instructions) stored on a computer-readable storage medium is executed by a processor 120 in an embodiment. As shown in FIG. 7, a computer-readable storage medium has a computer program (instructions) stored thereon, the programs (instructions) being executed by the processor 120 to implement one or more actions. The one or more actions include, at 710, obtaining a facial region of interest in an image in a photographing preview mode. At 720, the region of interest is focused on in a first focusing mode. At 730, it is determined whether the facial region of interest in the first focusing mode is stable. At 740, an auxiliary focusing mode is triggered to refocus on the facial region of interest in response to the determination that the facial region of interest in the first focusing mode is stable. The first focusing mode is different from the second focusing mode. In an embodiment, the first focusing mode is the Phase Detection Auto Focus (PDAF) mode, and the second can be a contrast focus mode or a laser focus mode.

When the computer program (instructions) stored on the computer-readable storage medium are executed, a facial region of interest in the focusing process can be determined according to the position information detected in the image, and focusing is performed in the PDAF mode once the facial region of interest is determined. That is, as long as a face appears in the photographing preview mode, the face will always be clear no matter how it moves. At the same time, when the facial region of interest in the PDAF mode is stable, the auxiliary focusing mode will be triggered to refocus on the facial region of interest. By the combined focusing of the PDAF mode and the auxiliary focusing mode, the focus time can be greatly reduced and the automatic focusing of the facial region of interest can be achieved quickly and accurately.

The technical features of the above-described embodiments may be combined arbitrarily. To make the description succinct, not all the possible combinations of the technical features in the above embodiments are described. However, any combinations of these technical features, as long as there is no contradiction in the combination, should be considered as described in this specification.

The above described embodiments merely represent several implementations of the present disclosure, and the description thereof is more specific and detailed, but it should not be understood that the scope of the disclosure patent is limited. It should be noted that, for those skilled in the art, several variations and improvements may be made without departing from the concept of the present disclosure, and these are all within the protection scope of the present disclosure. Therefore, the protection scope of the present disclosure shall be subject to the appended claims.

The invention claimed is:

1. A method of focusing, comprising:
obtaining a facial region of interest in an image in a photographing preview mode;
focusing on the facial region of interest in a first focusing mode;
determining whether the facial region of interest in the first focusing mode is stable; and
triggering a second focusing mode to refocus on the facial region of interest in response to a determination that the facial region of interest in the first focusing mode is stable, wherein the first focusing mode is different from the second focusing mode;
wherein determining whether the facial region of interest in the first focusing mode is stable comprises:
obtaining position information of the facial region of interest in a first frame, the first frame being a frame in which the facial region of interest has been focused on in the first focusing mode;
obtaining position information of the facial region of interest in consecutive N−1 frames counting from a second frame, and determining whether a difference between the position information of the facial region of interest in each of the consecutive N−1 frames and the position information of the facial region of interest in the first frame exceeds a preset threshold, where $3 \leq N \leq 5$;
if the difference between the position information of the facial region of interest in each of the consecutive N−1 frames and the first frame does not exceed a preset threshold, determining that the position information of the facial region of interest in the consecutive N frames does not change, if the difference between the position information of the facial region of interest in each of the consecutive N−1 frames and the first frame exceeds a preset threshold, determining that the position information of the facial region of interest in the consecutive N frames changes;

in response to the determination that the position information of the facial region of interest does not change, determining that the facial region of interest in the first focusing mode is stable; and in response to the determination that the position information of the facial region of interest changes, determining that the facial region of interest in the first focusing mode is not stable.

2. The method according to claim 1, wherein the position information of the facial region of interest in the first focusing mode is border coordinate parameter information of the facial region of interest.

3. The method according to claim 1, further comprising:
focusing on the facial region of interest in the first focusing mode continuously until the facial region of interest in the first focusing mode is stable.

4. The method according to claim 1, wherein the first focusing mode is a Phase Detection Auto Focus mode, and the second focusing mode is a contrast focusing mode or a laser focusing mode.

5. The method according to claim 3, wherein the focusing on the facial region of interest in the first focusing mode continuously until the facial region of interest is stable comprises:
when the difference between the position information of the facial region of interest in an $n^{th}$ frame of the consecutive N−1 frames and the first frame exceeds a preset threshold, focusing on the facial region of interest in the $n^{th}$ frame in the first focusing mode, and obtaining the position information of the facial region of interest in the $n^{th}$ frame; and
obtaining position information of the facial region of interest in consecutive N−1 frames counting from the $n^{th}$ frame, and determining whether a difference between the position information of the facial region of interest in each of the consecutive N−1 frames and the position information of the facial region of interest in the $n^{th}$ frame exceeds a preset threshold.

6. A terminal comprising an imaging device, a display device, a memory, a processor, and a computer program stored on the memory and executable on the processor, wherein the processor executes the computer program to implement one or more actions, the one or more actions comprising:
obtaining a facial region of interest in an image in a photographing preview mode;
focusing on the facial region of interest in a first focusing mode;
determining whether the facial region of interest in the first focusing mode is stable; and
triggering a second focusing mode to refocus on the facial region of interest in response to a determination that the facial region of interest in the first focusing mode is stable, wherein the first focusing mode is different from the second focusing mode;
wherein determining whether the facial region of interest in the first focusing mode is stable comprises:
obtaining position information of the facial region of interest in a first frame, the first frame being a frame in which the facial region of interest has been focused on in the first focusing mode;
obtaining position information of the facial region of interest in consecutive N−1 frames counting from a second frame, and determining whether a difference between the position information of the facial region of interest in each of the consecutive N−1 frames and the position information of the facial region of interest in the first frame exceeds a preset threshold, where 3≤N≤5;
if the difference between the position information of the facial region of interest in each of the consecutive N−1 frames and the first frame does not exceed a preset threshold, determining that the position information of the facial region of interest in the consecutive N frames does not change,
if the difference between the position information of the facial region of interest in each of the consecutive N−1 frames and the first frame exceeds a preset threshold, determining that the position information of the facial region of interest in the consecutive N frames changes;
in response to the determination that the position information of the facial region of interest does not change, determining that the facial region of interest in the first focusing mode is stable; and
in response to the determination that the position information of the facial region of interest changes, determining that the facial region of interest in the first focusing mode is not stable.

7. The terminal according to claim 6, wherein the position information of the facial region of interest in the first focusing mode is border coordinate parameter information of the facial region of interest.

8. The terminal according to claim 6, further comprising:
focusing on the facial region of interest in the first focusing mode continuously until the facial region of interest in the first focusing mode is stable.

9. The terminal according to claim 6, wherein the first focusing mode is a Phase Detection Auto Focus mode, and the second focusing mode is a contrast focusing mode or a laser focusing mode.

10. The terminal according to claim 8, wherein the focusing on the facial region of interest in the first focusing mode continuously until the facial region of interest is stable comprises:
when the difference between the position information of the facial region of interest in an $n^{th}$ frame of the consecutive N−1 frames and the first frame exceeds a preset threshold, focusing on the facial region of interest in the $n^{th}$ frame in the first focusing mode, and obtaining the position information of the facial region of interest in the $n^{th}$ frame;
obtaining position information of the facial region of interest in consecutive N−1 frames counting from the $n^{th}$ frame, and determining whether a difference between the position information of the facial region of interest in each of the consecutive N−1 frames and the position information of the facial region of interest in the $n^{th}$ frame exceeds a preset threshold.

11. A non-transitory computer readable storage medium having stored thereon a computer program, wherein the computer program is configured to be executed by a processor to implement one or more actions, the one or more actions comprising:
obtaining a facial region of interest in an image in a photographing preview mode;
focusing on the facial region of interest in a first focusing mode;

determining whether the facial region of interest in the first focusing mode is stable; and triggering a second focusing mode to refocus on the facial region of interest in response to the determination that the facial region of interest in the first focusing mode is stable, wherein the first focusing mode is different from the second focusing mode;

wherein determining whether the facial region of interest in the first focusing mode is stable comprises:

obtaining position information of the facial region of interest in a first frame, the first frame being a frame in which the facial region of interest has been focused on in the first focusing mode;

obtaining position information of the facial region of interest in consecutive N−1 frames counting from a second frame, and determining whether a difference between the position information of the facial region of interest in each of the consecutive N−1 frames and the position information of the facial region of interest in the first frame exceeds a preset threshold, where 3≤N≤5;

if the difference between the position information of the facial region of interest in each of the consecutive N−1 frames and the first frame does not exceed a preset threshold, determining that the position information of the facial region of interest in the consecutive N frames does not change, if the difference between the position information of the facial region of interest in each of the consecutive N−1 frames and the first frame exceeds a preset threshold, determining that the position information of the facial region of interest in the consecutive N frames changes;

in response to the determination that the position information of the facial region of interest does not change, determining that the facial region of interest in the first focusing mode is stable; and in response to the determination that the position information of the facial region of interest changes, determining that the facial region of interest in the first focusing mode is not stable.

12. The non-transitory computer readable storage medium according to claim 11, wherein the position information of the facial region of interest in the first focusing mode is border coordinate parameter information of the facial region of interest.

13. The non-transitory computer readable storage medium according to claim 11, further comprising:

focusing on the facial region of interest in the first focusing mode continuously until the facial region of interest in the first focusing mode is stable.

14. The non-transitory computer readable storage medium according to claim 11, wherein the first focusing mode is a Phase Detection Auto Focus mode, and the second focusing mode is a contrast focusing mode or a laser focusing mode.

* * * * *